United States Patent

Nordgren

[11] Patent Number: 5,813,587
[45] Date of Patent: Sep. 29, 1998

[54] LAMINATING MACHINE REGISTER-LENGTH AND WEB TENSION CONTROLLER

[75] Inventor: Richard Eric Nordgren, Daleville, Va.

[73] Assignee: Westvaco Corporation, New York, N.Y.

[21] Appl. No.: 788,846

[22] Filed: Jan. 27, 1997

Related U.S. Application Data

[63] Continuation of Ser. No. 538,350, Oct. 3, 1995.

[51] Int. Cl.⁶ .................... B65H 23/04; B65H 23/18; G05B 13/02
[52] U.S. Cl. .................. 226/29; 226/27; 364/162
[58] Field of Search ..................... 226/2, 27, 29, 226/30, 38, 39; 364/162

[56] References Cited

U.S. PATENT DOCUMENTS

| | | |
|---|---|---|
| 3,841,216 | 10/1974 | Huffman . |
| 3,880,076 | 4/1975 | Black et al. . |
| 4,096,801 | 6/1978 | Martin . |
| 4,704,171 | 11/1987 | Thompson et al. ............ 226/29 |
| 4,719,855 | 1/1988 | Cannon et al. . |
| 4,781,317 | 11/1988 | Ditto ............................ 226/29 |
| 4,966,075 | 10/1990 | Brian . |
| 5,221,058 | 6/1993 | Fillis ............................ 226/29 |
| 5,301,608 | 4/1994 | Szarka et al. . |
| 5,335,597 | 8/1994 | Helmstadter . |
| 5,337,669 | 8/1994 | Kanai . |
| 5,383,392 | 1/1995 | Kowalewski et al. . |
| 5,388,517 | 2/1995 | Levien . |

*Primary Examiner*—Charles A. Marmor
*Assistant Examiner*—Matthew A. Kaness
*Attorney, Agent, or Firm*—J. R. McDaniel; R. L. Schmalz

[57] ABSTRACT

A cascaded loop controller is used to control register or repeat lengths and web tension on laminating machines where the inner control loop utilizes register-length sensors near the unwind end of the laminating machine to make rapid adjustments in web tension that are necessary immediately following a reel splice and an outer control loop that provides a remote register-length set-point to the inner loop based upon a desired repeat length as measured near the rewind end of the laminating machine.

2 Claims, 1 Drawing Sheet

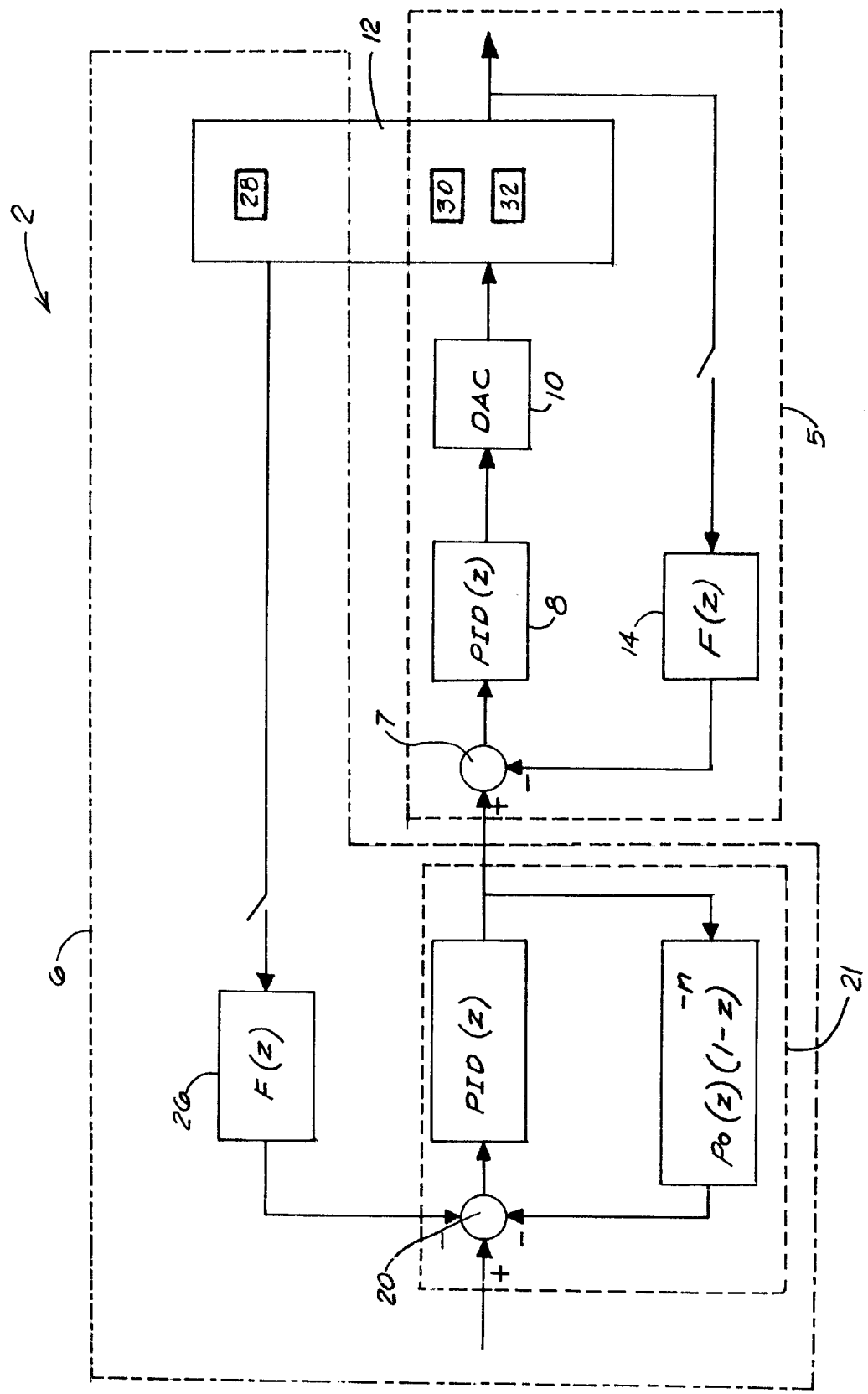
FIGURE

LAMINATING MACHINE REGISTER-LENGTH AND WEB TENSION CONTROLLER

This application is a Continuation of application Ser. No. 08/538,350 filed Oct. 3, 1995.

BACKGROUND OF THE INVENTION

1. Field of the Invention

This invention relates to the control of register or repeat lengths and web tension on laminating machines. Such structures of this type, generally, use a cascaded loop controller where the inner control loop utilizes register-length sensors near the unwind end of the laminating machine to make rapid adjustments in web tension that are necessary immediately following a reel splice and an outer control loop that provides a remote register-length set-point to the inner loop based upon a desired repeat length as measured near the rewind end of the laminating machine.

2. Description of the Related Art

Typically, a laminating machine initially produces creases or other regular mechanical impressions in the paperboard or base web material. Register marks are simultaneously printed by the laminating machine such that the register marks allow the laminating machine to sense the crease register. These regularly spaced register marks are typically used by a printing press to apply a graphical image in precise press alignment with these creases. Thus, it is important to be able to detect the creases and the use of the printed register marks allows the machine to be able to detect these creases.

Usually, the elimination of any register error present is accomplished by changing the tension on the uncoated web entering the creasing station. However, accurate control of register on the laminated material is needed. Consequently, in order to properly control this latter crease register, the necessary amount of prestretch in the paperboard must be determined. However, due to the different types of coatings placed on the paperboard, constant web tensions result in varying amounts of stretching in the laminated paperboard. Therefore, it would be advantageous to determine how much stretch should be put on the paperboard before it has been coated in order to properly control the crease register of this laminated material.

It is known, in laminating machines, to make use of a single loop PID (proportional plus integral plus derivative) controller. Such controllers of this type are designed to determine the desired stretch of the paperboard before it has been laminated. However, due to the nature of the single loop PID controller, oscillating register marks often are encountered in a laminating machine that uses a single loop PID controller. The oscillations are a result of the significant time delay incurred while the web travels from the unwind machine end to the rewind machine end where the crucial register-length measurement is made. Therefore, a still further advantageous controller, then, would be presented if the differences in stretch between the various laminated coated paperboard structures could be more adequately controlled.

It is apparent from the above that there exists a need in the art for a laminating machine register-length (web tension) controller which controls the crease and print registers through simplicity of parts and uniqueness of structure and which at least equals the register-length control characteristics of the known controllers, but which at the same time is able to control the differences in stretch between various laminated paperboard structures. It is a purpose of this invention to fulfill this and other needs in the art in a manner more apparent to the skilled artisan once given the following disclosure.

SUMMARY OF THE INVENTION

Generally speaking, this invention fulfills these needs by providing a paperboard laminating machine register-length controller, comprising a first data set-point entry means, a Smith-Predictor controller means operatively connected to the first data set-point entry means, and a PID controller means operatively connected to the Smith-Predictor controller means.

In certain preferred embodiments, the Smith-Predictor controller is used to compensate for the web transit time delay which occurs between the point of printing and web tension adjustment and the take-up reel where the crucial register-length measurements are made. Also, the PID controller utilizes register-length sensors near the unwind end of a paperboard laminating machine to make rapid adjustments in the web tension that are necessary immediately following a reel splice and provides a remote register-length set-point based upon a desired repeat length as measured near the rewind end of the laminating machine.

In another further preferred embodiment, the register-length controller accurately measures the register or repeat length and web tension on laminating machines that prepare the paperboard web for subsequent printing operations.

The preferred register-length controller, according to this invention, offers the following advantages: lightness in weight; ease of assembly and repair; good stability; good durability; excellent economy; increased laminating machine operating speeds; excellent web tension control; and excellent register-length control. In fact, in many of the preferred embodiments, these factors of economy, web tension control, increased operating speeds and register-length control are optimized to the extent that is considerably higher than heretofore achieved in prior, known register-length controllers.

BRIEF DESCRIPTION OF THE DRAWING

The above and other features of the present invention, which will become more apparent as the description proceeds, are best understood by considering the following detailed description in conjunction with the accompanying drawing, in which: the single FIGURE is a schematic illustration of a register-length controller, according to the present invention.

DETAILED DESCRIPTION OF THE INVENTION

With reference to the single FIGURE, there is illustrated a register-length (web tension) controller 2 for conventional laminator 12. Controller 2 includes, in part, inner PID (proportional plus integral plus derivative) loop 5 and outer Smith-Predictor loop 6. Inner loop 5 includes, in part, data set-point or summer 7, conventional PID controller 8, digital-to-analog converter 10, and conventional digital filter 14. It is to be understood that laminator 12, typically, has a means of producing an unwind register-length measurement, a rewind register length measurement, and a means for accepting a web tension command signal. It is to be understood that a conventional laminator rewind register-length measurer and a laminator unwind register-length measurer are simply devices located at the rewind and unwind ends, respectively, of the laminator that is capable of producing a register-length measurement. Such a device may be constructed from a rotary position encoder (not shown), which is attached to a web guide roller (not shown) at the unwind end of laminator 12, and a photo detector (not shown), which is mounted above the web over the guide roller. The photo detector produces an electrical pulse when a printed register mark passes beneath it. The signal from the position encoder can be used to determine a corresponding web displacement or "register-length" between two such marks or pulses. The presence of a conventional interface board (not shown) in a Personal Computer (PC) (not shown) containing a conventional counter-timer device (not shown) allows for the acceptance of the signals from the rotary position encoders and photo sensors and accomplishes the necessary counting operations required so as to continuously make available accurate length measurements of the web between two successive register marks. These devices, i.e., the rotary position encoder and photo detector, are conventional in the web handling industry.

Smith-Predictor loop 6, includes, in part, data set-point entry or summer 20, conventional Smith-Predictor 21, and conventional digital filter 26. A conventional Smith Predictor is a model based controller that is capable of providing satisfactory performance in the presence of large system time delays, such as the inherent delay between the time a section of raw paperboard is unwind from the unwind stand and the time that same material arrives at the rewind stand of the laminator.

During the operation of register-length controller 2, the flow of the control loop begins at data set-point entry means 20 which represents the register-length set-point. This is a value that is entered by the operator into the computer (not shown) which is running the register-length controller 2. This set-point is sent to the Smith-Predictor 21 which converts this set-point into an error signal by taking the difference between the set-point and the rewind register-length measurement, for example, as measured by a rotary position encoder 28 mounted on the rewind end of a conventional laminating paperboard machine 12. The Smith-Predictor 21 is encoded by conventional techniques with information regarding the varying amount of time before a register-length change is seen following a change in web tension, as well as, a means for predicting the magnitude of the register-length change for a given size change in the web tension. It is to be understood that the difference between Smith-Predictor loop 6 and conventional Smith-Predictor 21 is that Smith-Predictor loop 6 collectively refers to the objects that make up a control loop containing Smith-Predictor 21, i.e., Smith-Predictor 21, the actuator to which Predictor 21 sends its output, the sensor from which it receives its input, and a means for accepting an operator supplied setpoint. Conventional Smith-Predictor 21 is an embodiment of a controller that is capable of executing a control algorithm commonly referred to as "the Smith-Predictor:. This Smith-Predictor controller is programmed with a dynamical model of the system under control, i.e., its input/output response behavior and a PID control algorithm with programmable Proportional, Integral, and Derivative gains.

The Smith-Predictor 21 generates its own data set-point 7 which is passed on to the inner PID type control loop 5. The PID controller 8 is fed an error signal which is formed by taking the difference between set-point 7 and the unwind register-length measurement, for example, as measured by a rotary position encoder 30 mounted near the paperboard web tensioner 32 at the unwind end of the paperboard laminating machine 12. The PID controller 8, in conjunction with the digital to analog converter 10, converts this error signal into a web tension command signal which is fed to the web tensioner in the laminator. It is to be understood that a conventional tensioner 32, typically, includes a means for accepting a paper web tension command signal. This conventional means, typically, is comprised of a set of nipped pull-back rollers (not shown) driven by a variable speed A/C motor (not shown), a web tension transducer (not shown) and a closed loop P/D speed controller (not shown) that is capable of accepting a setpoint web tension signal which must be installed at the unwind end of laminating machine 12.

Finally, the register-length measurements which are represented by the laminator outputs must be carefully filtered to eliminate any high frequency noise from entering the controller 2 and to discard any outliers from the collective data. These functions are represented by digital filters 14 and 26, respectively.

In short, the controller 2 controls the register-length, independent of the operating speed of the laminating machine, through the use of the outer Smith-Predictor loop 5 which provides a floating set-point or summer 7 to outer PID loop 6. Set-point or summer 7 assumes a value necessary to give a zero register error on the measurement made at rewind of the laminating machine (not shown). The outer loop 6 then adjusts the web tension of the laminating machine shown schematically as laminator 12 to give a zero error on the register measurement made at the rewind end of the laminating machine (not shown). Also, controller 2 may support higher operating speeds of the laminating machine 12 due to its unique structure.

Once given the above disclosure, many other features, modifications or improvements will become more apparent to the skilled artisan. Such features, modifications or improvements are, therefore, considered to be a part of this invention, the scope of which is to be determined by the following claims.

What is claimed is:

1. A paperboard laminating machine register-length controller, wherein said controller is comprised of:

a first summer;

a Smith-Predictor loop operatively connected to said first summer;

a paperboard laminating machine operatively connected to said Smith-Predictor loop wherein said Smith-Predictor loop is further comprised of:

a laminator rewind register-length measurer located within said laminating machine;

a first filter operatively connected to said laminator rewind register-length measurer and said first summer; and a Smith-Predictor operatively connected to said first summer; and a PID loop operatively connected to said laminating machine and said Smith-Predictor loop.

2. The controller, as in claim 1, wherein said PID controller loop is further comprised of:

a second summer operatively connected to said Smith-Predictor loop;

a PID controller operatively connected to said second summer;

a converter operatively connected to said PID controller;

a laminator unwind register-length measurer operatively connected to said converter; and a second filter operatively connected to said laminator unwind register-length measurer and said second summer.

* * * * *